United States Patent
Masuda

(10) Patent No.: US 7,279,874 B2
(45) Date of Patent: Oct. 9, 2007

(54) POWER SUPPLY DEVICE WITH DEAD-TIME CONTROL AND PRINTING APPARATUS HAVING THE SAME

(75) Inventor: Kazunori Masuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 11/002,015

(22) Filed: Dec. 2, 2004

(65) Prior Publication Data
US 2005/0135132 A1    Jun. 23, 2005

(30) Foreign Application Priority Data
Dec. 4, 2003    (JP)    ............................. 2003-406142

(51) Int. Cl.
*G05F 1/00*    (2006.01)
(52) U.S. Cl. ...................................... 323/282; 323/283
(58) Field of Classification Search ................ 323/901, 323/283, 284, 288, 238, 222, 282
See application file for complete search history.

(56) References Cited

U.S. PATENT DOCUMENTS

| | | | | |
|---|---|---|---|---|
| 5,847,950 A | * | 12/1998 | Bhagwat | ...................... 363/78 |
| 5,862,301 A | * | 1/1999 | Gontowski, Jr. | ............ 388/800 |
| 5,966,003 A | * | 10/1999 | Takimoto et al. | ........... 323/224 |
| 6,369,557 B1 | * | 4/2002 | Agiman | ...................... 323/282 |
| 6,515,880 B1 | * | 2/2003 | Evans et al. | ................... 363/49 |
| 6,674,272 B2 | * | 1/2004 | Hwang | ........................ 323/284 |
| 6,731,099 B2 | * | 5/2004 | Inatomi et al. | ............. 323/284 |
| 2001/0045815 A1 | * | 11/2001 | Muratov et al. | ............ 323/280 |

FOREIGN PATENT DOCUMENTS

| | | |
|---|---|---|
| JP | 5-83933 A | 4/1993 |
| JP | 5-161345 A | 6/1993 |

* cited by examiner

*Primary Examiner*—Karl Easthom
*Assistant Examiner*—Harry Behm
(74) *Attorney, Agent, or Firm*—Morgan & Finnegan LLP

(57) ABSTRACT

In a power supply device including a PWM-controlled DC/DC converter which changes an output voltage on the basis of a setting signal, and a control unit, the DC/DC converter includes a circuit for changing a dead-time control voltage in accordance with a control signal. A dead-time control circuit is arranged, which sets the ON duty of a PWM main switching element at a predetermined time constant in accordance with the dead-time control voltage. The control unit outputs the setting signal and control signal. In this arrangement, an input rush current generated in changing the output voltage during operation can be reduced, and the time required for causing the output voltage to reach the setting value can also be shortened.

5 Claims, 15 Drawing Sheets

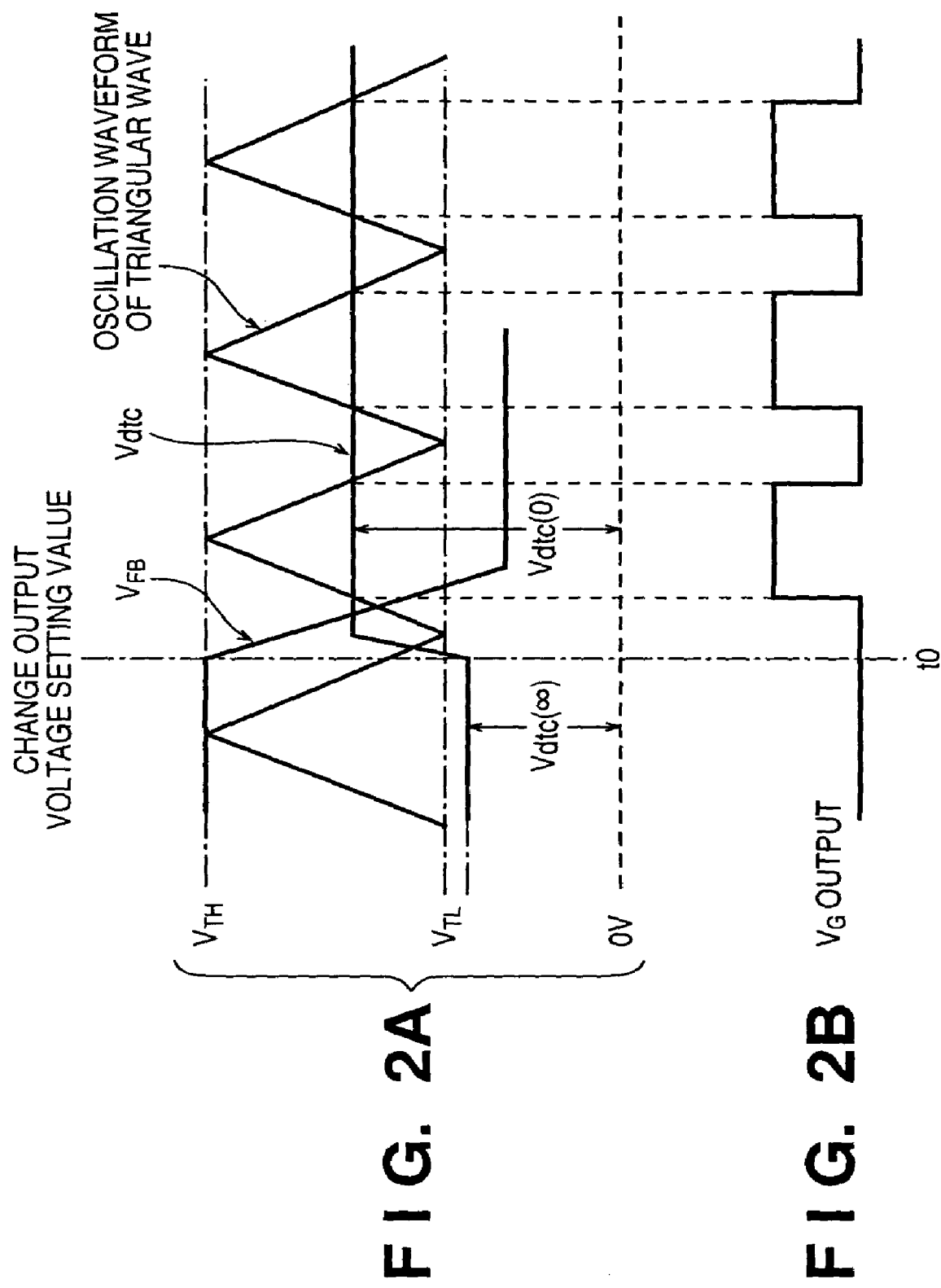

POWER SUPPLY DEVICE WITH DEAD-TIME CONTROL AND PRINTING APPARATUS HAVING THE SAME

FIELD OF THE INVENTION

The present invention relates to a power supply device and a printing apparatus having the same and, more particularly, to a power supply device used as a power supply for an electronic device and any other device and including a PWM-controlled DC/DC converter which changes an output voltage on the basis of a setting signal, and a printing apparatus having the power supply device.

BACKGROUND OF THE INVENTION

A switching DC/DC converter is very popular as a power supply for an electronic device or any other device. A known type of switching DC/DC converter can change or regulate an output voltage in accordance with a setting signal (command) from the control unit of an electronic device or any other external device.

FIG. 10 is a diagram showing the typical circuit arrangement of such a DC/DC converter. The illustrated circuit is a PWM-controlled DC/DC converter. A power supply control IC 7 includes a PWM comparator 53 incorporated in a power supply control IC 7 and having a function of setting the maximum ON-duty of a switching element Q101.

This function is generally called dead-time control. The maximum ON-duty is limited by a control voltage Vdtc of a dead-time control circuit 4 arranged outside the control IC 7. The dead-time control circuit 4 includes a capacitor C1 which also serves as a soft start function of preventing the flow of a rush current at the start of the DC/DC converter. When the power supply is activated, a gradual increase in charge voltage of the capacitor C1 is used to gradually increase the ON duty of the PWM-controlled DC/DC converter. Upon activation, when the converter reaches a steady state (the stable state in which the voltage has reached to the desired voltage), the dead-time control voltage Vdtc becomes a constant value. This voltage value defines the maximum ON duty.

To change an output voltage Vo from the DC/DC converter in accordance with a setting signal from the control unit 3 of the electronic device or an external device, a voltage setting signal from the control unit 3 is input to a DA converter 6. The DA converter 6 converts the input signal into an analog voltage. The analog voltage is input to the V_ terminal of an error amplifier 54 which detects the output voltage. The V_ terminal voltage is a reference voltage for setting the output voltage Vo. This reference voltage is compared with the V_+ terminal voltage of the error amplifier 54 which is obtained by causing resistors R101 and R102 to divide the output voltage Vo. PWM control is performed such that the V_+ terminal voltage becomes equal to the V_ terminal voltage, thereby adjusting and controlling the ON/OFF duty of the switching element Q101.

The output voltage Vo from the DC/DC converter is given by:

$$Vo = V_- \times (R101 + R102)/R102$$

where V_ is the output from the DA converter 6. That is, a voltage proportional to the output from the DA converter can be supplied from the DC/DC converter in FIG. 10 to a load 2 of the electronic device.

As described above, in the DC/DC converter capable of changing the output voltage from the setting signal from the control unit of the electronic device or the external device, the power supply IC 7 and its peripheral circuits have different operations depending on a timing at which the output voltage setting signal from the control unit 3 is output.

A case in which a voltage setting signal is output from the control unit 3 before activating the DC/DC converter, and the reference voltage V_ for setting the output voltage Vo from the DA converter 6 is determined will be taken as an example.

When a voltage required for activating the power supply control IC 7 is applied to the input terminal of the DC/DC converter, the power supply system in the control IC is activated, and a reference voltage source 51 is also activated to output a reference voltage Vref. At this time, the output voltage is 0 [V], and the V_+ terminal voltage of the error amplifier 54 which detects the output voltage is also 0 [V]. The output voltage from the DA converter 6 which is based on the voltage setting data from the control unit 3 is supplied to the V_ terminal voltage of the error amplifier 54. An output VFB from the error amplifier saturates to a minimum voltage (0 [V]). The output VFB from the error amplifier is input to the PWM comparator 53. Reference numeral 8 denotes a circuit which adjusts the phase for stabilizing the feedback control of the error amplifier 54.

In the dead-time control circuit 4, since the reference voltage Vref is 0 [V] before power-on, the voltage between the terminals of the capacitor C1 is also 0 [V]. Upon power-on, when the reference voltage Vref becomes the defined reference voltage, e.g., 2.5 [V], the voltage at the capacitor C1 becomes 0 [V]. Hence, the output Vdtc from the dead-time control circuit 4 becomes 2.5 [V] immediately upon power-on. However, the output voltage Vdtc is gradually discharged via the resistor R3, and exponentially reduced.

FIG. 11 is a graph showing an example of the change of the dead-time control voltage Vdtc upon power-on (upon activation), where Vref=2.5 [V], R2=180 [kΩ], R3=220 [kΩ], and C1=0.47 [μF].

The output VFB from the error amplifier 54 and the output Vdtc from the dead-time control circuit 4 are input to the + input terminal of the PWM comparator 53. A triangular wave having a constant frequency is input from a triangular oscillator 52 to the − input terminal. The PWM comparator 53 compares a triangular wave level and a higher signal level at two + input terminals. The ON/OFF signal VG of the switching element is output via an output driver 55 such that if the triangular wave level is higher, the switching element Q101 is turned on, and if the triangular wave level is lower, the switching element Q101 is turned off.

Therefore, upon power-on, the output VFB from the error amplifier saturates to a minimum voltage (0 [V]). However, since the dead-time control voltage Vdtc is gradually reduced from 2.5 V as shown in FIG. 11, the output from the PWM comparator gradually increases from 0% of the ON duty to prevent the excessive input current flow. In an example shown in FIG. 11, according to the triangular wave level, a peak voltage VTH is 1.97 [V], and the bottom voltage VTL is 1.48 [V]. Such operation upon power-on is called a soft start function of suppressing the input rush current, as in the DC/DC converter which converts the output voltage into a fixed value.

As a similar soft start function, Japanese Patent Laid-Open No. 05-83933 discloses a means for monitoring the input voltage, and resetting the dead-time control voltage when the voltage is abnormally reduced, in order to prevent the excessive current input generated immediately upon restoring a normal input voltage value, when the input voltage is abnormally reduced.

Japanese Patent Laid-Open No. 05-161345 discloses a scheme for monitoring a load current in order to prevent an output voltage from an overvoltage state immediately upon restoring a steady output current value from the overcurrent protective operation state set upon generation of an output overcurrent, and resetting a dead-time control voltage upon generation of an overcurrent.

The operation of the conventional DC/DC converter capable of changing the output voltage is ensured when the setting voltage is determined by the control unit 3 in advance. For example, the conventional DC/DC converter is used as a DC/DC converter having the function of regulating the output voltage in order to adjust variations in characteristics of the load device connected to the DC/DC converter.

Some electronic device requires a DC/DC converter having a function of changing the output voltage while supplying power to the load device. Examples of such a device are an electronic device which must change the power supply voltage upon a change in temperature of the load since the load temperature changes during operation, and an electronic device which must change the power supply voltage within a short period of time because the power supplied from the power supply must be abruptly changed during operation.

The DC/DC converter which applies the power supply voltage to such an electronic device must receive an output voltage change setting signal from the control unit during supply of a given output voltage and must change the output voltage to the setting voltage within the short period of time. This operation will be described using a conventional circuit in FIG. 10.

During operation at a given output voltage Vo(0), the voltage $V_+(0)$ obtained by causing the resistors R101 and R102 to divide the output voltage Vo(0) is applied to the + terminal of the error amplifier 54 and becomes equal to the voltage $V_-(0)$ applied from the DA converter 6 to the − terminal.

In this case, when the setting signal (command to increase the output voltage) which changes the output voltage is output from the control unit 3, the voltage from the DA converter 6 changes to $V_-(1)$ ($V_-(1)>V_-(0)$). At this time, the output voltage does not change, and the + input terminal voltage from the error amplifier 54 is still $V_+(0)$. Then, a difference occurs between the voltages input to the error amplifier 54. The output VFB is reduced to the minimum voltage 0 [V], and input to the PWM comparator 53. After the sufficient period of time upon power-on, the output voltage from the dead-time control circuit 4 is the Vdtc(∞) obtained by causing the resistors R2 and R3 to divide the Vref voltage. In the example shown in FIG. 11, the output voltage from the dead-time control circuit 4 is lower than the minimum voltage of the triangular wave.

The two + input terminal voltages from the PWM comparator 53 are equal to or lower than the minimum voltage of the triangular wave. The PWM signal output from the PWM comparator 53 has an ON duty of 100%. Hence, the main switching element Q101 is completely turned on. The excessive current flows, and the main switching element Q101 may fail. Furthermore, an operation error may occur in the overcurrent protective circuit for an input-side AC adapter and battery.

Alternatively, when a signal which reduces the setting voltage is output from the control unit 3 in an output state with no load, the output capacitor C102 of the DC/DC converter cannot be discharged, and it takes a long time until the output voltage is reduced to the setting value, thus posing a problem.

SUMMARY OF THE INVENTION

It is an object of the present invention to reduce an input rush current generated when changing an output voltage during operation, and to reduce the time required to cause the output voltage to reach the setting voltage in a power supply device including a DC/DC converter which can widely change the output voltage on the basis of a voltage setting signal from an external device.

According to an aspect of the present invention, the above object is attained by a power supply device comprising: a PWM-controlled DC/DC converter which changes an output voltage on the basis of a setting signal, the DC/DC converter including voltage change means for changing a dead-time control voltage in accordance with a control signal and having a dead-time control circuit which sets an upper limit value of an ON duty of a PWM main switching element at a predetermined time constant in accordance with the dead-time control voltage; and control means for outputting the setting signal and the control signal.

That is, according to the present invention, in the power supply device including control means and a PWM-controlled DC/DC converter which changes the output voltage on the basis of the setting signal, the DC/DC converter includes voltage change means for changing a dead-time control voltage in accordance with a control signal, and has a dead-time control circuit which sets the ON duty of a PWM main switching element at a predetermined time constant in accordance with the dead-time control voltage to output the setting signal and control signal from the control means.

In this processing, when changing the output voltage during the DC/DC converter operation, the dead-time control voltage changes in accordance with the control signal output from the control means. The upper limit value of the ON duty of a PWM main switching element changes in accordance with the dead-time control voltage, thereby changing the output voltage.

Hence, since the control signal appropriately changes the dead-time control voltage, the output voltage from the DC/DC converter can efficiently change within a short period of time.

The control means may output the control signal so as to output a dead-time control signal whose ON duty increases when an output voltage is set higher than a present value, and output the control signal so as to output a dead-time control voltage whose ON duty value decreases when the output voltage is set lower than the present value.

In this case, the control means may output the control signal in synchronism with a timing at which the setting signal which changes the output voltage is updated, and output the control signal so as to set the ON duty value to a given value corresponding to a voltage value larger than an average voltage of a present output voltage and a setting output voltage when the output voltage is set higher than the present value, the given value falling within a range between the present output voltage and the setting output voltage.

The dead-time control circuit may include a capacitor which determines the time constant, and the voltage change means may include a discharge switching element connected parallel to the capacitor to discharge the capacitor in accordance with the control signal.

In this case, the voltage change means may control an ON time of the discharge switching element in accordance with the control signal, thereby changing the dead-time control voltage.

Preferably, the device further comprises an output capacitance discharge circuit formed from a resistor and switching element arranged between output terminals of the DC/DC converter, wherein the control means outputs a discharge control signal which operates the output capacitance discharge circuit for a predetermined period of time in synchronism with the setting signal which changes the output voltage.

In this case, the control means may output the discharge control signal only when the output voltage is set lower than the present value.

The above object can also be achieved by the printing apparatus which uses the above power supply device as a power supply for driving a printhead, and performs printing using thermal energy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are timing charts showing the waveforms of respective units in the circuit shown in FIG. 1;

DETAILED DESCRIPTION OF THE PREFERRED EMBODIMENTS

Preferred embodiments of the present invention will now be described in detail in accordance with the accompanying drawings. Note that each of constitution elements described in the following embodiments is only an example, and is not intended to limit the scope of the present invention thereto.

Note that according to embodiments described below, in an inkjet printing apparatus, a DC/DC converter of the present invention is used as a DC/DC converter which supplies power to a printhead driving power supply.

<Overall Arrangement of Printing Apparatus>

Figure 13:
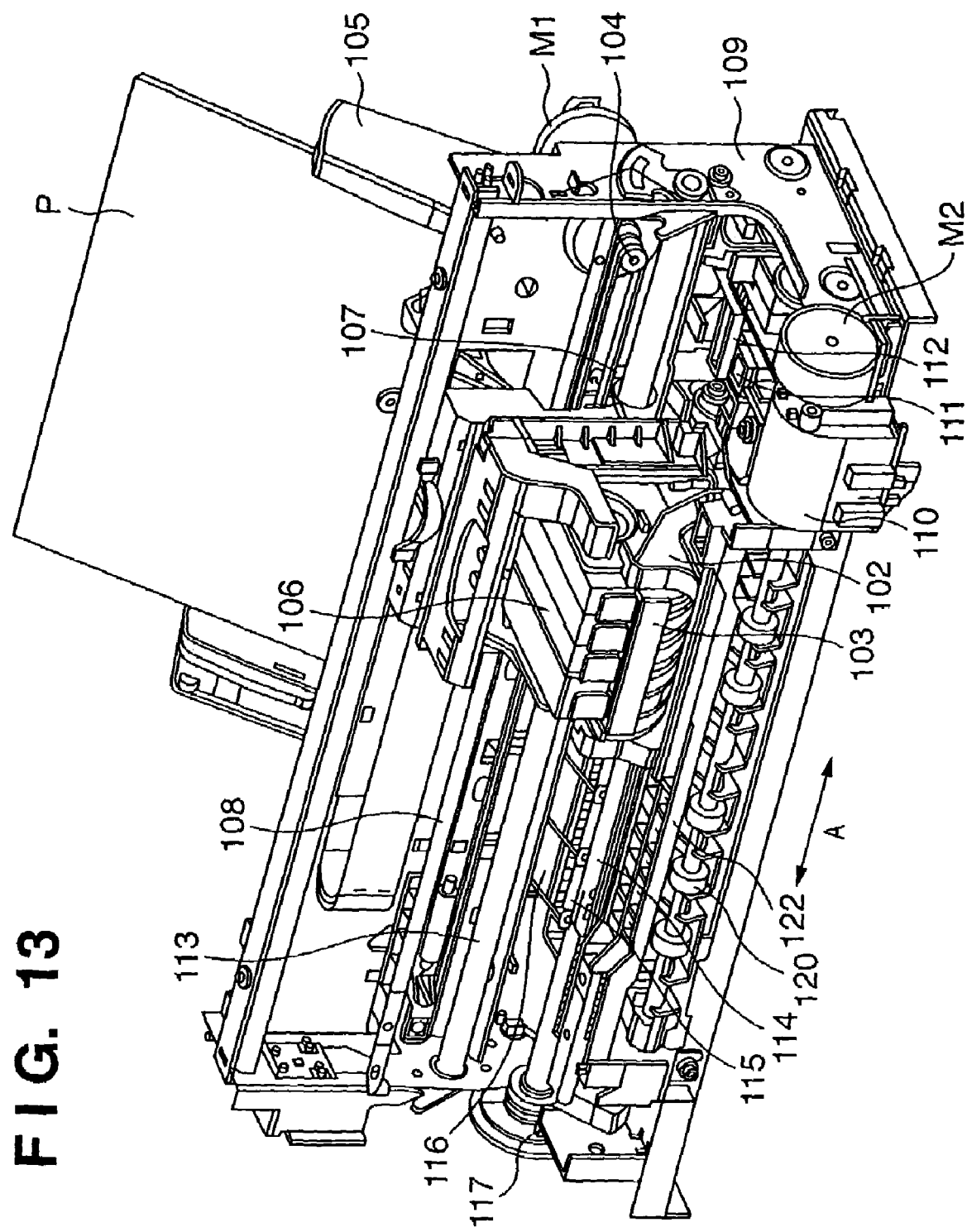
FIG. 13 is a perspective view showing the outer appearance of an inkjet printing apparatus in the present invention.

FIG. 13 is an outer perspective view showing the schematic configuration of an inkjet printing apparatus as a typical embodiment of the present invention.

As shown in FIG. 13, in the inkjet printing apparatus (to be referred to as a printing apparatus hereinafter), a transmission mechanism 104 transmits a driving force generated by a carriage motor M1 to a carriage 102 which supports a printhead 103 for discharging ink to print by the inkjet method. The carriage 102 reciprocates in a direction indicated by an arrow A. A printing medium P such as a printing sheet is fed via a sheet feed mechanism 105, and conveyed to a printing position. At the printing position, the printhead 103 discharges ink to the printing medium P to print.

In order to maintain a good state of the printhead 103, the carriage 102 is moved to the position of a recovery device 110, and a discharge recovery process for the printhead 103 is executed intermittently.

The carriage 102 of the printing apparatus supports not only the printhead 103, but also an ink cartridge 106 which stores ink to be supplied to the printhead 103. The ink cartridge 106 is detachably mounted on the carriage 102.

The printing apparatus shown in FIG. 13 can print in color. For this purpose, the carriage 102 supports four ink cartridges which respectively store magenta (M), cyan (C), yellow (Y), and black (K) inks. The four ink cartridges are independently detachable.

The carriage 102 and printhead 103 can achieve and maintain a predetermined electrical connection by properly bringing their contact surfaces into contact with each other. The printhead 103 selectively discharges ink from a plurality of orifices and prints by applying energy in accordance with the printing signal. In particular, the printhead 103 according to the embodiment adopts an inkjet method of discharging ink by using thermal energy, and comprises an electrothermal transducer in order to generate thermal energy. Electric energy applied to the electrothermal transducer is converted into thermal energy. Ink is discharged from orifices by utilizing a pressure change caused by the growth and contraction of bubbles by film boiling generated by applying the thermal energy to ink. The electrothermal transducer is arranged in correspondence with each orifice, and ink is discharged from a corresponding orifice by applying a pulse voltage to a corresponding electrothermal transducer in accordance with the printing signal.

As shown in FIG. 13, the carriage 102 is coupled to part of a driving belt 107 of the transmission mechanism 104 which transmits the driving force of the carriage motor M1. The carriage 102 is slidably guided and supported along a guide shaft 113 in the direction indicated by the arrow A. The carriage 102 reciprocates along the guide shaft 113 by normal rotation and reverse rotation of the carriage motor M1. A scale 108 which represents the absolute position of the carriage 102 is arranged along the moving direction (direction indicated by the arrow A) of the carriage 102. In the embodiment, the scale 108 is prepared by printing black bars on a transparent PET film at a necessary pitch. One end of the scale 108 is fixed to a chassis 109, and its other end is supported by a leaf spring (not shown).

The printing apparatus has a platen (not shown) in opposition to the orifice surface having the orifices (not shown) of the printhead 103. Simultaneously when the carriage 102 supporting the printhead 103 reciprocates by the driving force of the carriage motor M1, a printing signal is supplied to the printhead 103 to discharge ink and print on the entire width of the printing medium P conveyed onto the platen.

In FIG. 13, reference numeral 114 denotes a convey roller which is driven by a convey motor M2 in order to convey the printing medium P; 115, a pinch roller which makes the printing medium P abut against the convey roller 114 by a spring (not shown); 116, a pinch roller holder which rotatably supports the pinch roller 115; and 117, a convey roller gear which is fixed to one end of the convey roller 114. The convey roller 114 is driven by rotation of the convey motor M2 that is transmitted to the convey roller gear 117 via an intermediate gear (not shown).

Reference numeral 120 denotes a discharge roller which discharges the printing medium P bearing an image formed by the printhead 103 outside the printing apparatus. The discharge roller 120 is driven by transmitting rotation of the convey motor M2. The discharge roller 120 abuts against a spur roller (not shown) which presses the printing medium P by a spring (not shown). Reference numeral 122 denotes a spur holder which rotatably supports the spur roller.

As shown in FIG. 13, in the printing apparatus, the recovery device 110 which recovers the printhead 103 from a discharge failure is arranged at a desired position (e.g., a position corresponding to the home position) outside the reciprocation range (printing area) for printing operation of the carriage 102 supporting the printhead 103.

The recovery device 110 comprises a capping mechanism 111 which caps the orifice surface of the printhead 103, and a wiping mechanism 112 which cleans the orifice surface of the printhead 103. The recovery device 110 performs a discharge recovery process in which a suction means (suction pump or the like) within the recovery device forcibly discharges ink from orifices in synchronism with capping of the orifice surface by the capping mechanism 111, thereby removing ink with a high viscosity or bubbles in the ink channel of the printhead 103.

In non-printing operation or the like, the orifice surface of the printhead 103 is capped by the capping mechanism 111 to protect the printhead 103 and prevent evaporation and drying of ink. The wiping mechanism 112 is arranged near the capping mechanism 111, and wipes ink droplets attached to the orifice surface of the printhead 103.

The capping mechanism 111 and wiping mechanism 112 can maintain a normal ink discharge state of the printhead 103.

<Control Configuration of Printing Apparatus>

Figure 14:
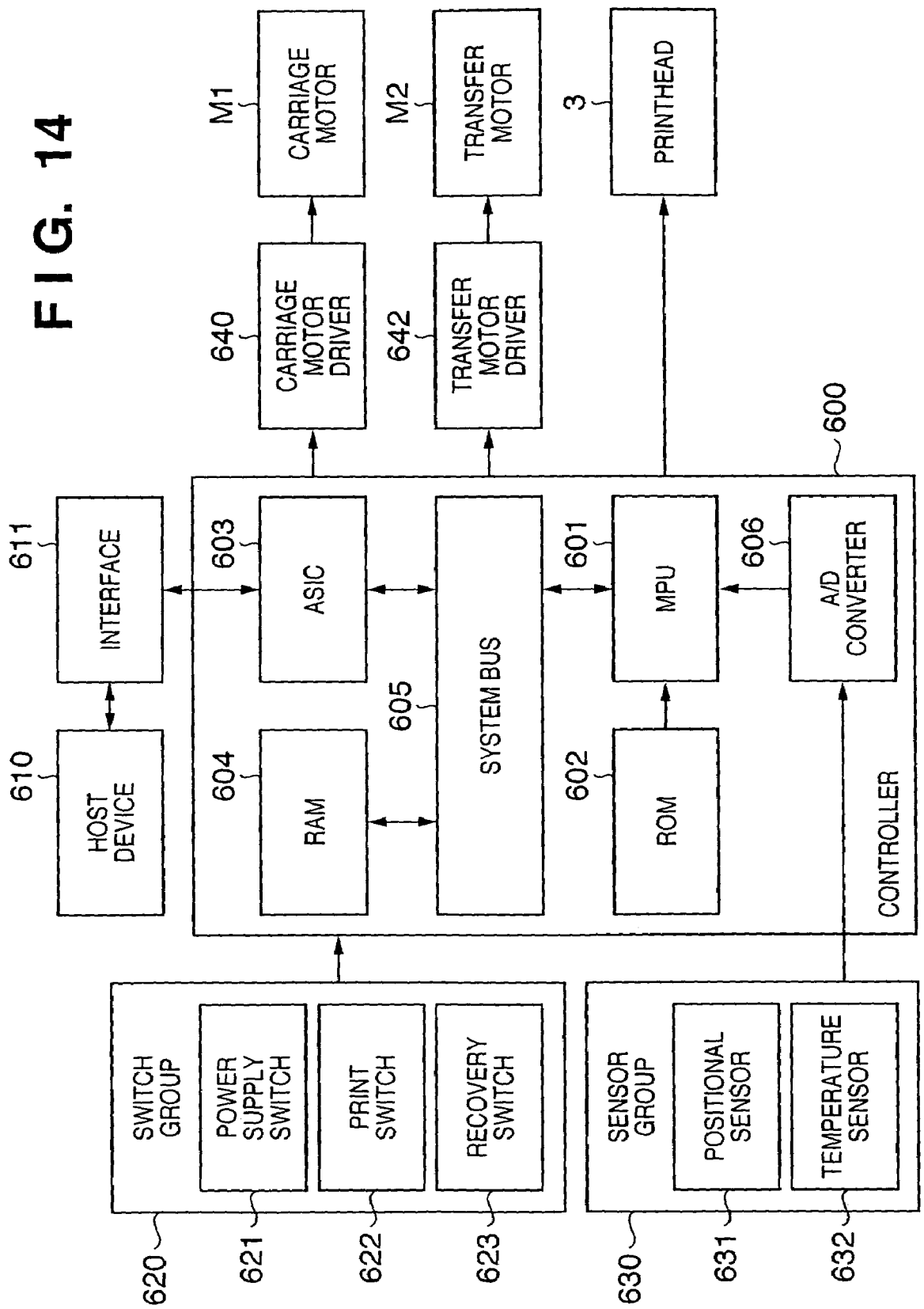
FIG. 14 is a block diagram showing the arrangement of the control circuit of the printing apparatus shown in FIG. 13.

FIG. 14 is a block diagram showing the control configuration of the printing apparatus shown in FIG. 13.

As shown in FIG. 14, a controller 600 comprises an MPU 601, a ROM 602 which stores a program corresponding to a control sequence (to be described later), a predetermined table, and other fixed data, an ASIC (Application Specific IC) 603 which generates control signals for controlling the carriage motor M1, the convey motor M2, and the printhead 103, a RAM 604 having an image data rasterizing area, a work area for executing a program, and the like, a system bus 605 which connects the MPU 601, ASIC 603, and RAM 604 to each other and exchange data, and an A/D converter 606 which A/D-converts analog signals from a sensor group (to be described below) and supplies digital signals to the MPU 601.

In FIG. 14, reference numeral 610 denotes a host apparatus such as a computer (or an image reader, digital camera, or the like) serving as an image data supply source. The host apparatus 610 and printing apparatus 1 transmit/receive image data, commands, status signals, and the like via an interface (I/F) 611.

Reference numeral 620 denotes a switch group which is formed from switches for receiving instruction inputs from the operator, such as a power switch 621, a print switch 622 for designating the start of print, and a recovery switch 623 for designating the activation of a process (recovery process) of maintaining good ink discharge performance of the printhead 103. Reference numeral 630 denotes a sensor group which detects the state of the apparatus and includes a position sensor 631 such as a photocoupler for detecting a home position and a temperature sensor 632 arranged at a proper portion of the printing apparatus in order to detect the ambient temperature.

Reference numeral 640 denotes a carriage motor driver which drives the carriage motor M1 for reciprocating the carriage 102 in the direction indicated by the arrow A; and 642, a convey motor driver which drives the convey motor M2 for conveying the printing medium P.

In printing and scanning by the printhead 103, the ASIC 603 transfers driving data (DATA) for a printing element (discharge heater) to the printhead while directly accessing the storage area of the RAM 604.

A DC/DC converter used as a power supply circuit which supplies power to the printhead of the above inkjet printing apparatus will be described below.

<Outline of DC/DC Converter>

Figure 1:
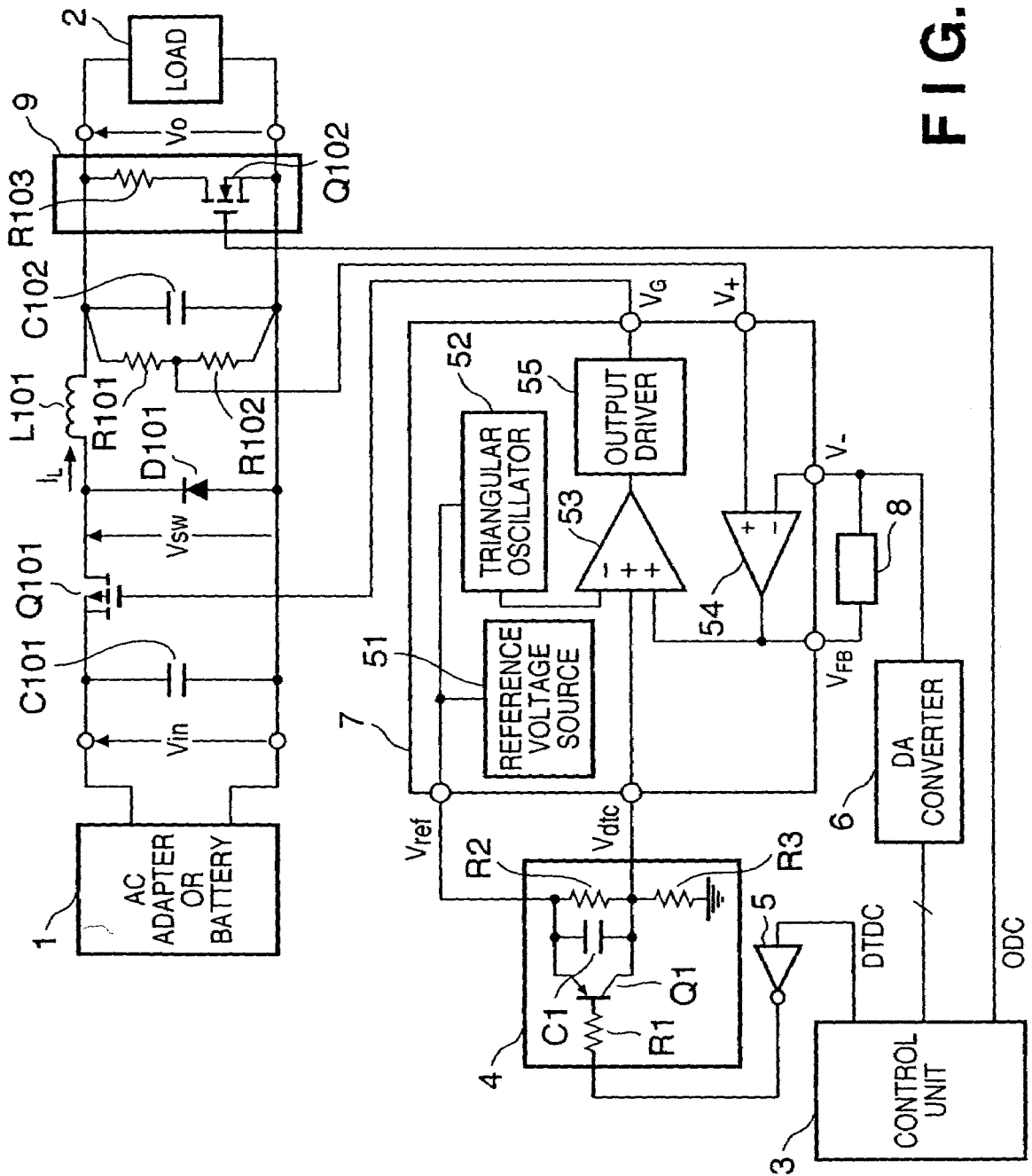
FIG. 1 is a circuit diagram showing the arrangement of a DC/DC converter according to the first embodiment of the present invention.
Figure 3A:
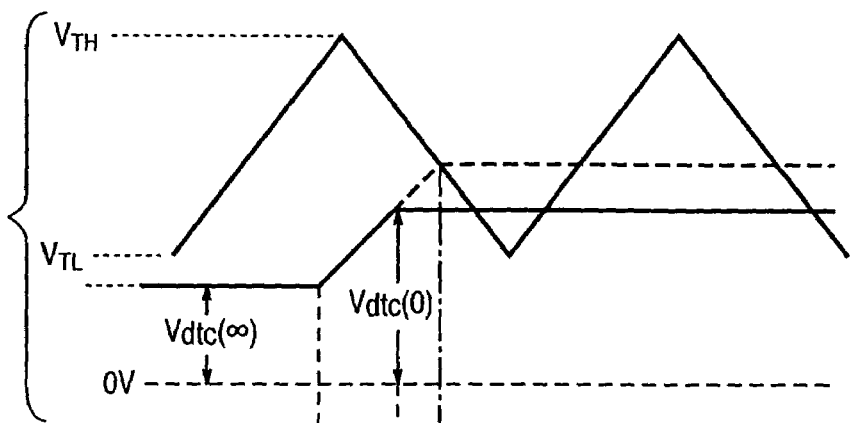
FIGS. 3A to 3D are timing charts showing the timings of a voltage setting data signal, DTDC signal, and ODC signal in the circuit shown in FIG. 1.
Figure 3B:
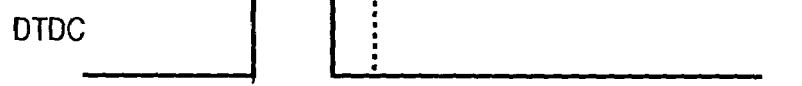
Figure 3C:
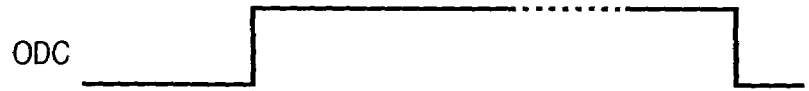
Figure 3D:
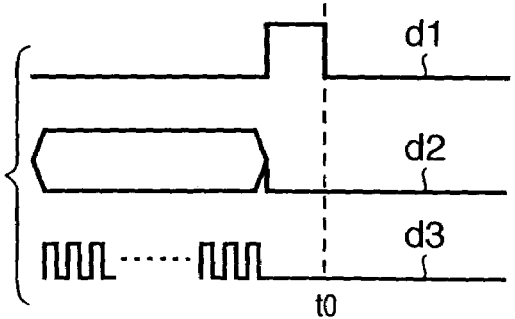

FIG. 1 is a block diagram showing the arrangement of a DC/DC converter according to the present invention. As shown in FIG. 1, a PWM-controlled step-down converter can widely change an output voltage Vo on the basis of a setting signal from a control unit 3.

In FIG. 1, the control unit 3 controls the operation of an electronic device or the like, and outputs a setting signal for setting the output voltage Vo from the DC/DC converter. This control unit corresponds to a controller 600 shown in FIG. 14. Reference numeral 4 denotes a duty setting circuit which determines the maximum ON duty value (upper limit value) as a main switching element Q101 ON time ratio in the DC/DC converter. In this specification, the duty setting circuit is called a dead-time control circuit. Reference numeral 5 denotes a NOT circuit (inverter) which inverts a DTDC signal output from the control unit 3; 6, a DA converter; 7, a power supply control IC; 8, a time-constant circuit which adjusts the frequency characteristics of an error amplifier 54; and 9, a discharge circuit for reducing the output voltage Vo.

A case wherein during the operation of the DC/DC converter at an output voltage Vo(0), the setting signal for changing the output voltage to a voltage Vo(1) is output from the control unit 3 will be described below with reference to an circuit diagram in FIG. 1 and waveforms in FIGS. 2A and 2B. Note that the changed output voltage Vo(1) is higher than the output voltage Vo(0) before the change.

Before the setting signal for changing the output voltage is output, if the output current of the DC/DC converter is in an output state with no load, the power can be supplied from the input side by only the internal loss of the DC/DC converter, and the main switching element Q101 is almost kept off. Therefore, the output voltage VFB from the error amplifier 54 is equal to or higher than the peak voltage VTH of the triangular wave. At the same time, two input voltages $V_+(0)$ and $V_-(0)$ to the error amplifier 54 are output from the DA converter 6. Also, the voltage Vdtc is a voltage Vdtc($\infty$) obtained by causing the resistors R2 and R3 to divide the voltage Vref, because sufficient time has been elapsed after powering ON. The voltage Vdtc($\infty$) is slightly lower than the minimum voltage VTL of the triangular wave.

In this case, when the setting signal for changing the output voltage to the voltage Vo(1) from the control unit 3 at time t0, and the output from the DA converter 6 changes (increases) to $V_-(1)$, the output voltage cannot change immediately. Hence, the + input terminal voltage of the error amplifier 54 is kept at $V_+(0)$. Note that, the voltages input to the error amplifier 54 satisfy $V_-(1) > V_+(0)$. The output voltage VFB from the error amplifier 54 is reduced to the minimum voltage, and the reduced voltage is input to the PWM comparator 53. At the same time, the signal DTDC for changing the voltage Vdtc is supplied from the control unit 3 to the dead-time control circuit 4. The voltage Vdtc changes from the voltage Vdtc($\infty$) to the voltage Vdtc(0), and the changed voltage is input to the PWM comparator 53 (see FIG. 2A). An output signal VG which is supplied from the control IC 7 to the main switching element Q101 via an output driver 55 is a PWM signal which is a duty obtained by comparing the triangular wave oscillation waveform and the voltage Vdtc(0). The main switching element Q101 repeats ON/OFF, and the output voltage from the DC/DC converter increases to the setting value Vo(1).

Therefore, unlike in the conventional circuit, the main switching element Q101 is not completely turned on, and the input rush current is suppressed.

The output signal VG from the control IC 7 is determined by the voltage Vdtc(0) from the dead-time control circuit 4 and the waveform of the triangular wave shown in FIG. 2A. Hence, if the voltage Vdtc(0) from the dead-time control circuit 4 is excessively high, the ON duty of the output signal VG from the control IC 7 becomes low. As a result, the output voltage cannot increase to the setting output voltage Vo(1), and it takes a long time until the output voltage reaches the setting voltage Vo(1). The voltage changing time required by the DC/DC converter cannot be satisfied.

Alternatively, when the voltage Vdtc(0) from the dead-time control circuit 4 is excessively low, the On duty of the output signal VG from the control IC 7 is kept high until the output voltage reaches the setting voltage. Hence, a coil current IL across a coil L101 is excessively large, and a large input rush current is generated.

As described above, in order to reduce the input rush current generated in changing the output value, and reducing the time required for causing the output voltage to reach the setting voltage, the setting signal for changing the output voltage must be output from the control unit 3, and the voltage Vdtc(0) from the dead-time control circuit 4 must be set to an optimal voltage value in synchronism with a timing at which the voltage from the DA converter 6 changes, in accordance with the setting value Vo(1) of the output voltage.

The setting of the voltage Vdtc from the dead-time control circuit 4 in the DC/DC converter according to the present invention will be described with reference to more detailed embodiments.

First Embodiment

In this embodiment, when an output voltage setting value Vo(1) is low in the output voltage setting range, a voltage Vdtc(0) of a dead-time control circuit 4 is changed to a high voltage. With this operation, an increase in coil current IL can be limited by the upper limit value of the ON duty in PWM control, thereby reducing an input rush current. In this case, even if the ON duty value in PWM control is kept small, the ON duty in PWM control in the steady state is originally kept low because of a low output voltage. Even if the ON duty is strongly limited, the response time upon a change in voltage is not prolonged, and the time required to cause the output voltage to reach the setting voltage Vo(1) falls within a predetermined time.

When the output voltage before the change in voltage is high, the ON duty value in PWM control in the steady state is originally large. Unless the maximum ON duty (upper limit value or limit value of the ON duty value) in PWM control is set higher than the ON duty value in PWM control in the steady state, the coil current IL does not increase, and accordingly the output voltage cannot increase. When the output voltage setting value Vo(1) is high, the voltage Vdtc(0) of the dead-time control circuit 4 is changed to a low voltage. The coil current IL increases at an ON duty determined by the voltage Vdtc(0) of the dead-time control circuit 4. The time required for causing the output voltage to reach the setting value Vo(1) falls within the predetermined time. At this time, the ON duty value in PWM control in the steady state before the change in output voltage is already kept high, the coil current IL does not excessively increase even if the maximum ON duty (upper limit value or limit value of the ON duty) becomes higher. The output voltage can reach the setting value Vo(1), and the input current does not excessively increase.

A means for changing the voltage Vdtc(0) of the dead-time control circuit 4 described above into a desired voltage value will be described with reference to FIG. 1 and FIGS. 3A to 3D.

Referring to FIG. 1, the dead-time control circuit 4 includes a capacitor C1 and resistors R2 and R3 which generally determine a time constant of several ten ms to several hundred ms in order to prevent a rush current upon power-on. As in the conventional case, if Vref=2.5 [V], R2=180 [kΩ], R3=220 [kΩ], and C1=0.47 [μF], then the time constant is 46.5 ms.

According to this embodiment, for example, a PNP transistor Q1 is additionally connected across the capacitor C1. A resistor R1 is connected to the base of the transistor Q1 which determines the base current. The transistor Q1 is ON/OFF-controlled such that a DTDC signal output from a control unit 3 is inverted by a NOT circuit 5 and then supplied to the base of the transistor Q1 via the resistor R1. The control unit 3 outputs three kinds of signals to a DA converter 6. These signals are a signal representing the output completion of voltage setting data, a serial data signal to set the voltage, and a clock signal for transferring the data.

FIGS. 3A to 3D are timing charts of signals related to the output timing of the DTDC signal. The control unit 3 outputs voltage setting data (FIG. 3D) to the DA converter 6. Reference symbol d1 denotes a signal representing the completion of voltage setting data output; d2, serial voltage data; and d3, a clock signal. The control unit 3 outputs the DTDC signal at a timing t0 (FIG. 3B) when the signal d1 is set at high level once and the output of the voltage data is complete (operation of the DA converter 6 changes). The DTDC signal changes to "high level". The DTDC signal is inverted to "low level" by the NOT circuit 5 to render the PNP transistor Q1 conductive. Since the emitter-to-collector voltage of the transistor Q1 is equal to the voltage at the capacitor C1, i.e., Vref−Vdtc(∞), the transistor Q1 operates in the active region. The collector current causes the capacitor C1 to discharge at a constant current hfe (current amplification factor) times the base current.

An increase ΔV of the voltage Vdtc is given by $$\Delta V = IC \times tDTCC/C1 =$$
$$IB \times hfe \times tDTCC/C1 = (Vref - VBE) \times hfe \times tDTCC/(C1 \times R1)$$

where tDTCC is the pulse width of the DTDC signal, R1 is the base resistance, C1 is the capacitance of the capacitor, IB is the base current, and IC is the collector current.

Vdtc(0) is defined as follows:

$$Vdtc(0)=Vdtc(\infty)+(Vref-VBE) \times hfe \times tDTCC/(C1 \times R1) \quad (1)$$

therefore, the voltage Vdtc increases in proportion to the pulse width tDTCC of the DTDC signal.

When the dead-time control circuit 4 described above is used, the control unit 3 can generate a DTDC signal having an appropriate pulse width tDTCC on the basis of the output voltage setting value of the DC/DC converter. The control unit 3 supplies the DTDC signal to the dead-time control circuit 4 in synchronism with a voltage setting data output timing. As described above, when the output voltage from the DC/DC converter is to be changed, the input rush current can be suppressed, and at the same time, the output voltage can reach the setting voltage within a short period of time.

Figure 4:
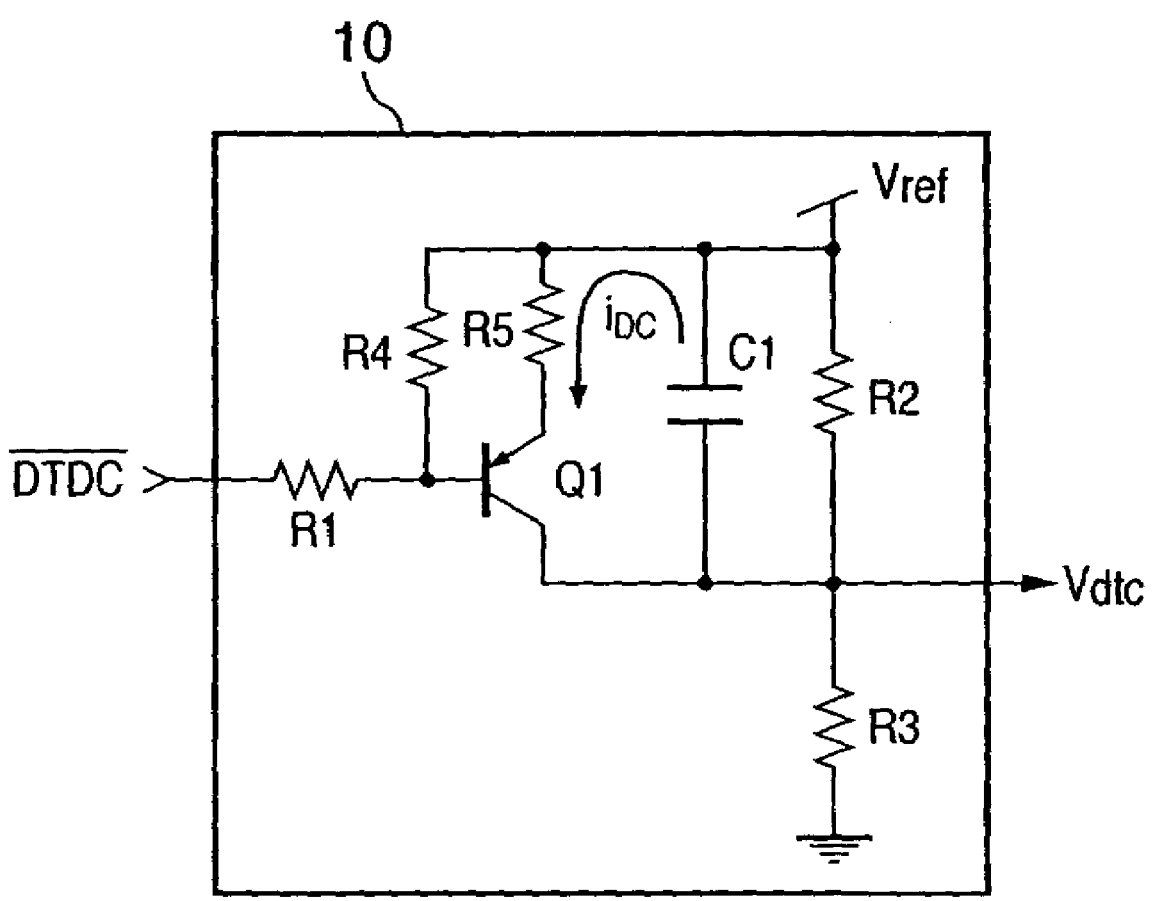
FIG. 4 is a circuit diagram showing the modification of the dead-time control circuit shown in FIG. 1.

FIG. 4 is a circuit diagram showing a modification of the dead-time control circuit. The output Vdtc(0) of the dead-time control circuit has a voltage represented by equation (1), as described above. However, the current amplification factor hfe of the transistor generally varies greatly. As a result, even if the pulse width of the DTDC signal is constant, the voltage Vdtc(0) cannot be kept at a predetermined value, but varies. In addition, the time required for causing the output voltage to reach the setting value falls outside the desired time.

The deal-time control circuit 10 shown in FIG. 4 has a circuit arrangement to prevent this inconvenience. Even if the current amplification factor hfe of the transistor varies, resistors R4 and R5 are arranged to keep almost constant the collector current IC which discharges the capacitor C1. The collector current IC of the transistor Q1 in the circuit of FIG. 4 can be expressed by:

$$IC=(Vref \times R4/(R1+R4)-VBE)/R5 \times (1-R1 \times R4/(R1+R4)/R5/hfe) \quad (2)$$

As an example, if Verf=2.5 V, R1=1 kΩ, R4=4.7 kΩ, and R5=100 Ω, then the practical value can be calculated as IC=13.6×(1-8.25/hfe) [mA]. When hfe is 100, then the collector current IC is 12.5 [mA], and when the hfe is 200, then the collector current is 13.0 [mA]. Even if the current amplification factor hfe of the transistor varies twice, the collector current IC can be kept almost constant.

In this modification, the voltage increase ΔV per unit time of the voltage Vdtc can be set by:

if C1=0.47 μF, then ΔV=0.277 [V/μs]

Second Embodiment

A DC/DC converter according to the second embodiment of the present invention will be described below. In the following description, portions which are the same as those of the first embodiment will not be described, and the characteristic portions of the second embodiment will be described below.

In the above first embodiment, the object of the present invention can be achieved. In the second embodiment, a rush current is further reduced, and a time required for causing an output voltage to reach a setting value is reduced. The basic circuit arrangement is the same as in FIG. 1.

In the present embodiment, it is a feature that in synchronism with a timing at which the setting signal of the output voltage output from a control unit 3 changes, a dead-time control voltage Vdtc(0) changes to obtain an ON duty which corresponds the voltage between the output voltage value before updating and the updated output voltage value.

In PWM control, the ON duty of a main switching element Q101 is an output voltage/input voltage in the steady state of a rated load. When the input voltage is Vin (constant), the output voltage before updating is Vo(0), and the updated output voltage is Vo(1) (Vo(1)>Vo(0)), the ON duty corresponding to the output voltage before updating is Vo(0)/Vin, the ON duty corresponding to the updated output voltage is Vo(1)/Vin. Therefore, the ON duty Don corresponding to the voltage between the output voltage value before updating and the updated output voltage value is $$Vo(0)/Vin < Don < Vo(1)/Vin$$

In this embodiment, the dead-time control voltage Vdtc(0) changes so as to reduce the time required for causing the output voltage to reach the setting value, and to obtain the ON duty corresponding to the slightly larger voltage value than the average of the output voltage before updating and the updated output voltage, or the dead-time control voltage Vdtc(0) changes so as to obtain the ON duty corresponding to a voltage within a voltage range between the average value of output voltages before and behind the update and updated voltage.

This control is especially effective when the output voltage widely changes. For example, the time required for causing the output voltage to change the output voltage from 15 V to 18 V, and the maximum value of the coil current IL will be described, and a method of deriving the optimal setting value of the dead-time control voltage Vdtc(0) will also be described.

In the step of changing the output voltage of the DC/DC converter during power supply operation, as described above, the main switching element Q101 turns on/off at the ON duty (almost constant value) of the PWM control determined by the dead-time control voltage Vdtc(0). When the output voltage value becomes almost equal to the setting voltage Vo(1), the main switching element Q101 operates at the ON duty of the normal PWM control determined by the output voltage/input voltage. Therefore, when considering the relationship between time required for causing the output voltage to reach the setting voltage and the maximum coil current IL, the main switching element Q101 approximately operates at the constant ON duty determined by the dead-time control voltage Vdtc(0).

In this case, using a circuit simulator SCAT (available from Keisoku Gijyutsu Kenkyu-sho), the change in output voltage when operating the DC/DC converter at a predetermined ON duty and the increased value of the coil current.

Figure 5:
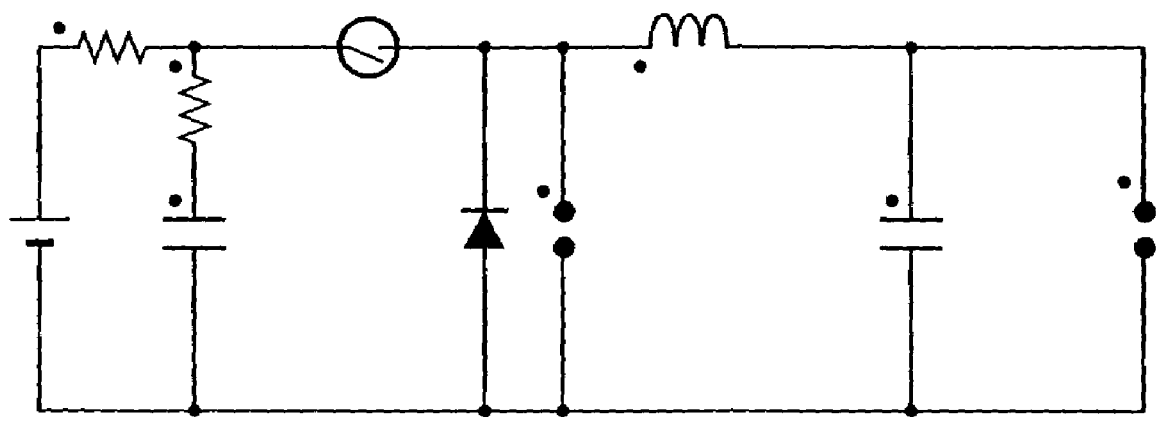
FIG. 5 is a circuit diagram used for a simulation according to the second embodiment.

FIG. 5 is a circuit diagram in the simulation, which corresponds to the circuit except for the control portion below in the circuit arrangement of the DC/DC converter in FIG. 1.

Note that the input voltage is 30 V, the output voltage Vo(0) before updating is 15 V, and the updated target output voltage Vo(1) is 18 V. This simulation aims at, when the main switching element Q101 operates at the constant ON duty, reaching the target voltage, and obtaining an ON duty for minimizing the increase in the coil current IL. Note that the ON duty corresponding to the output voltage before updating is 15 V/30 V=50%, and that corresponding to the updated output voltage is 18 V/30 V=60%.

Figure 6:
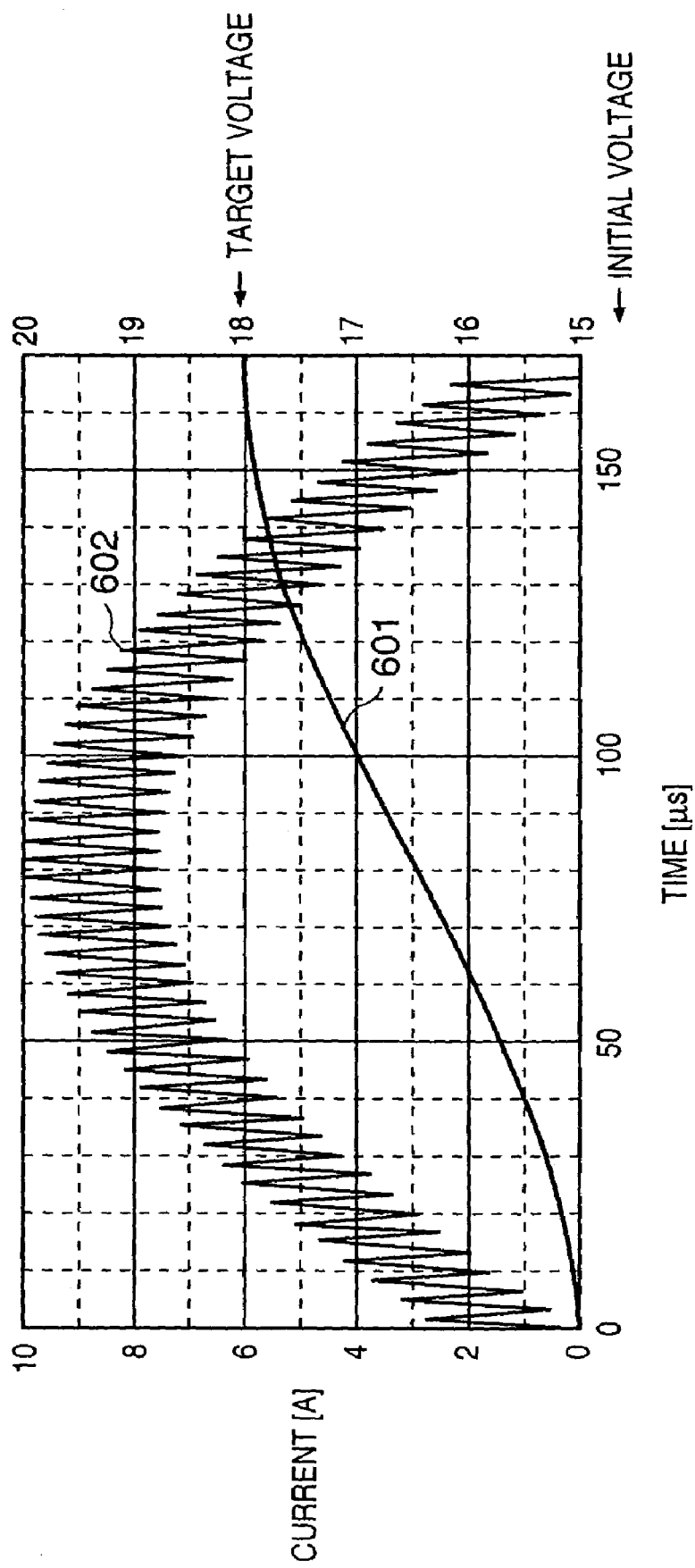
FIG. 6 is a graph showing the simulation result in the circuit shown in FIG. 5.

The waveform shown in FIG. 6 represents the result when all the circuit elements shown in FIG. 5 are ideal elements. That is, the reference numeral 601 represents changes in output voltage when the ON resistance of the switching element is 0, the ON voltage of a diode is 0, the ON resistance is 0, the series resistance of a coil L1 is 0, and the equivalent series resistance of the capacitor C2 is 0. Reference numeral 602 represents changes in coil current.

As described above, in the ideal state of the circuit element, if the circuit operates at the ON duty of 55% which is the average value of the ON duty of 50% corresponding to the output value before updating and the ON duty of 60% corresponding to the updated output voltage, the maximum coil current can be obtained when the output voltage corresponds to the ON duty of 55%, i.e., the output voltage reaches 16.5 V. When the output value exceeds 16.5 V, the coil current is gradually reduced, and the minimum value of the coil current becomes 0 when the output voltage reaches the target voltage, i.e., 18 V.

That is, in this simulation, it is confirmed that the target voltage value can be obtained, and the increase in coil current can be minimized when the circuit operates at the ON duty of the average value of the output voltage value before updating and the updated output voltage value.

However, a circuit element which is actually used must satisfy design specifications of the DC/DC converter, and be implemented at low cost. Hence, each element has a parasitic resistance so that the above ideal state cannot be obtained.

Figure 7A:
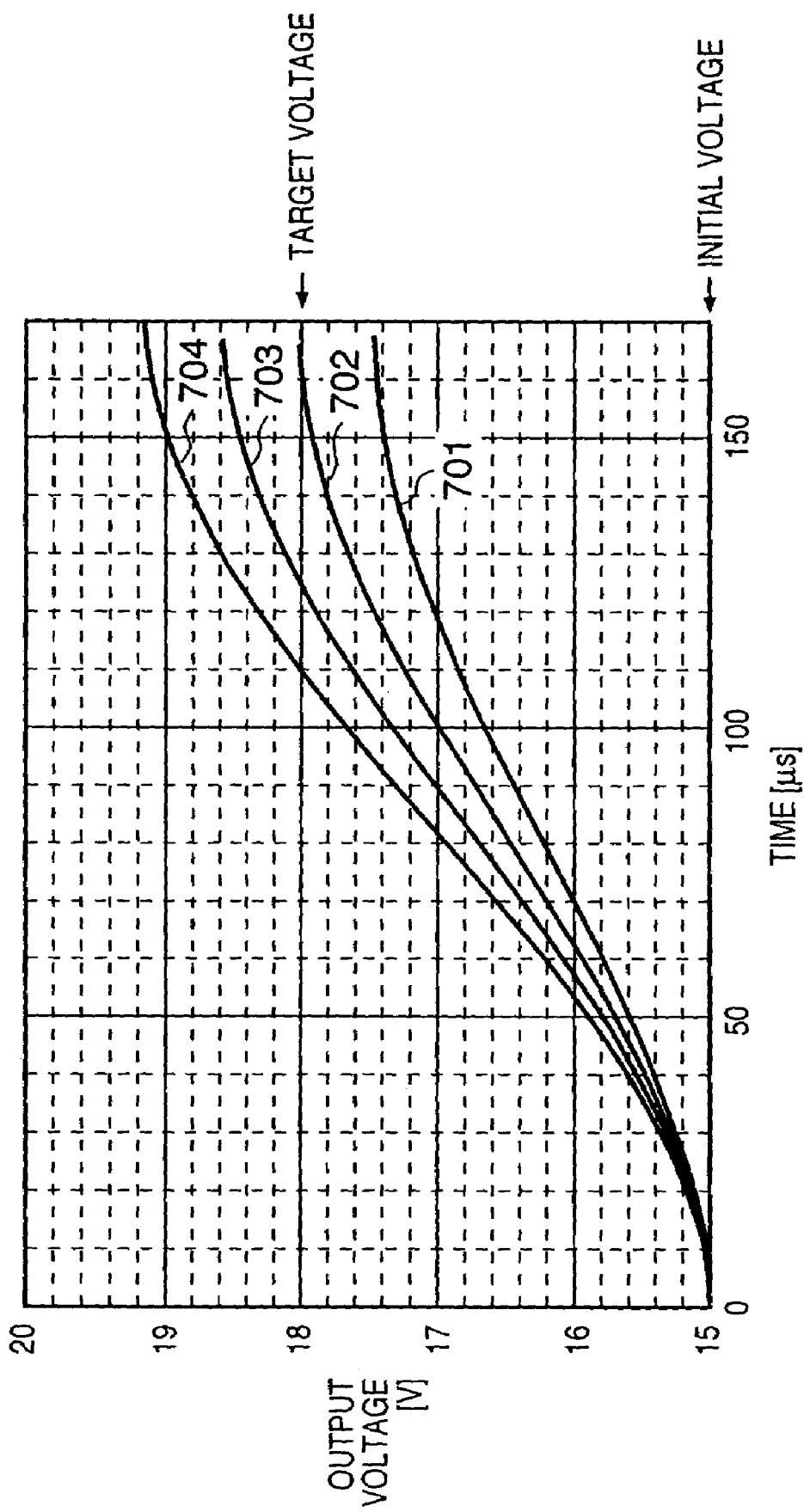
FIGS. 7A and 7B are graphs showing the relationship between an ON duty and output voltage according to the second embodiment.
Figure 7B:
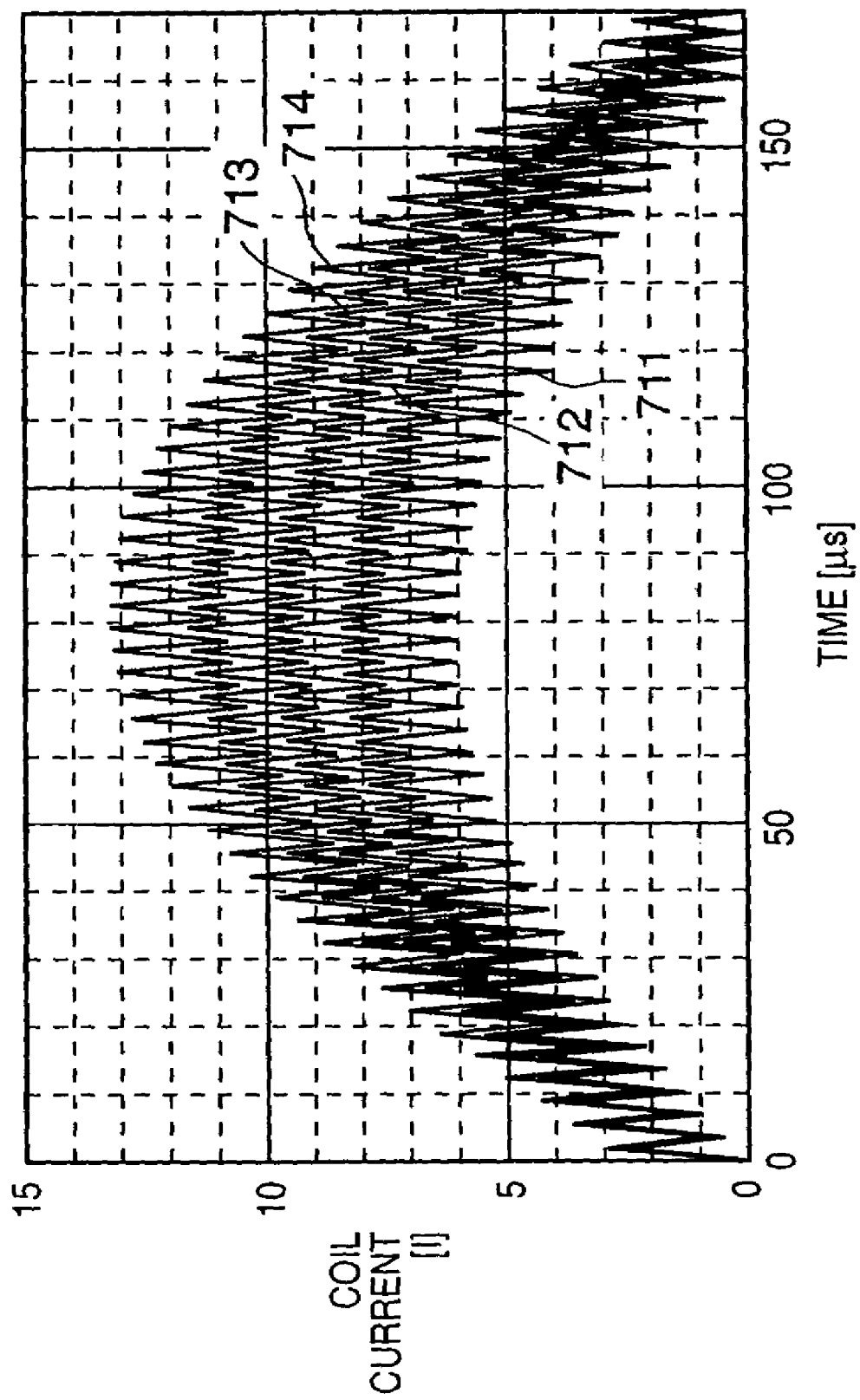

In consideration of this problem, FIGS. 7A and 7B respectively show the changes in output voltages and coil currents in the case of simulation wherein the ON duty changes by 1% at a time. In FIGS. 7A and 7B, reference numerals 701 to 704 respectively represent the voltages at the ON duties of 55% to 58%. In FIG. 7B, reference numerals 711 to 714 respectively represent the currents at the ON duties of 55% to 58%.

In accordance with the result of this simulation, the voltage cannot reach the target voltage when the ON duty is 55%, and the voltage can reach the target voltage when the ON duty is 56%. When the ON duty further increases, e.g., 57% or 58%, while the voltage can rapidly reach the target voltage, the coil current becomes large, and the input current increases.

As described above, preferably, the ON duty of the main switching element corresponds to the voltage value between the unupdated output voltage value and the updated output voltage value, and is slightly larger than the average of the ON duty. Actually, the ON duty to be set may be determined in consideration of the characteristics of the parts to be used.

The ON duty determined as described above can be implemented by the arrangement of the dead-time control circuit described in the first embodiment, and the circuit operation based on the DTDC signal output from the control unit 3.

Third Embodiment

A DC/DC converter according to the third embodiment of the present invention will be described below. In the following description, portions which are the same as those of the first and second embodiments will not be described, and the characteristic portions of the third embodiment will be described below.

The DC/DC converter described in the first and second embodiments optimizes the operation in increasing an output voltage.

When reducing the output voltage, especially, when a load current is 0, it is difficult to set an output voltage to a target output voltage within a predetermined time only by adjusting the ON duty of a main switching element Q101. Hence, in the third embodiment, when a setting value Vo(1) of an output voltage from a control unit 3 is lower than a setting value Vo(0) of an output voltage before updating, a discharge circuit 9 for discharging a capacitor C102 connected between output terminals and a capacitor (not shown) arranged on a load device is arranged. In synchronism with a timing at which the setting signal of the output voltage output from the control unit 3 changes, an ODC signal for turning on the switching element Q101 in the discharge circuit 9 is supplied from the control unit 3.

Figure 8:
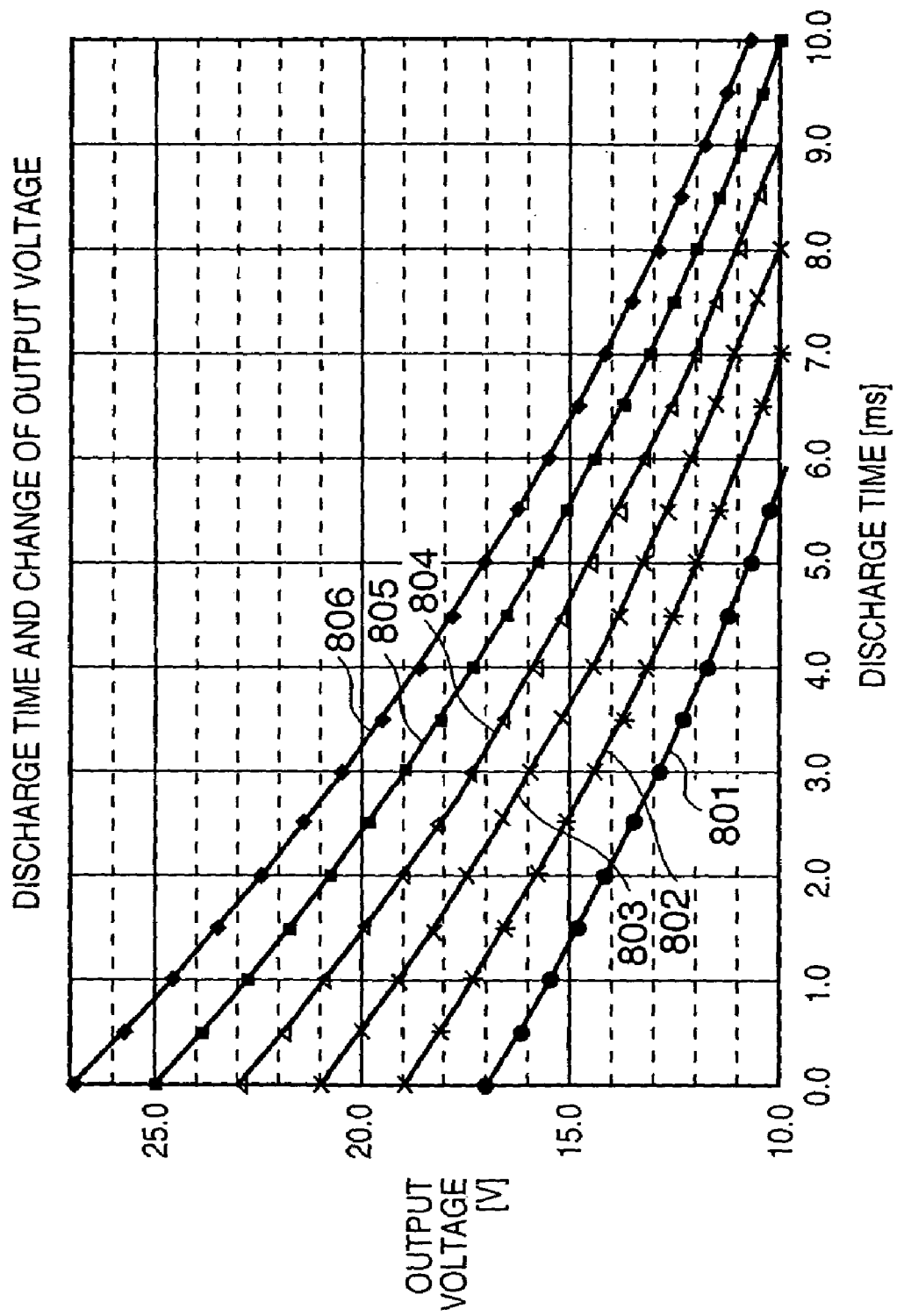
FIG. 8 is a graph showing the relationship between an output voltage and discharge time according to the third embodiment.

FIG. 8 is a graph showing an example of the relationship between the changes in the output voltage and the pulse width of an ODC signal, i.e., the discharge time of the switching element Q101. Reference numeral 801 represents the output voltage Vo(0)=17 V before updating; 802, Vo(0)=19 V; 803, Vo(0)=21 V; 804, Vo(0)=23 V; 805, Vo(0)=25 V; and 806, Vo(0)=27 V. Note that discharge characteristics shown in FIG. 8 represent an example when the output capacitor C102=330 μF, and the discharge resistance R103=33Ω.

The ODC signal output from the control unit 3 is preferably a pulse signal, and its pulse width may be always constant in spite of the setting value of the output voltage in order to reduce the output voltage to the target voltage value within a predetermined time within a range of all the voltages required as the output voltages of the DC/DC converter.

Also, the pulse width of the ODC signal may be changed in accordance with the setting value of the output voltage. More specifically, the pulse width increases when the setting value for the output voltage is low, and the pulse width is reduced when the setting value for the output voltage is low. The pulse width may be set by optimizing the resistance value of the discharge resistor R103 in consideration of the capacitance value of the output capacitor C102 in accordance with the change in the voltage and the change in time. Thus, the pulse width of the ODC signal changes in accordance with the setting value for the output voltage such that the power loss in the discharge circuit can be reduced.

In order to further reduce the power loss, and increase the output voltage in the discharge circuit, the output voltage Vo(0) before updating is compared with the updated output voltage Vo(1) in order not to turn on the discharge circuit 9. When increasing the output voltage, the ODC signal is not output. Also, when reducing the output voltage, the ODC signal has a pulse width corresponding to the difference between the output voltage Vo(0) before updating and the updated output voltage Vo(1).

As described above, when the DC/DC converter according to this embodiment is used, the control unit outputs the setting signal for changing the output voltage during operation, and the output voltage can change from the voltage value before updating to the setting voltage value within a short period of time (within a predetermined period of time). Furthermore, the element breakdown caused by the input rush current, and an operation error of the overcurrent protective circuit on the input side unit of the DC/DC converter can be avoided.

The above-described operational mechanism in changing in the voltage is applied to the circuit shown in FIG. 1. However, the power supply control IC may include an error amplifier 54 whose input polarities are inverted, or a PWM comparator 53 whose input polarities are inverted.

Figure 12:
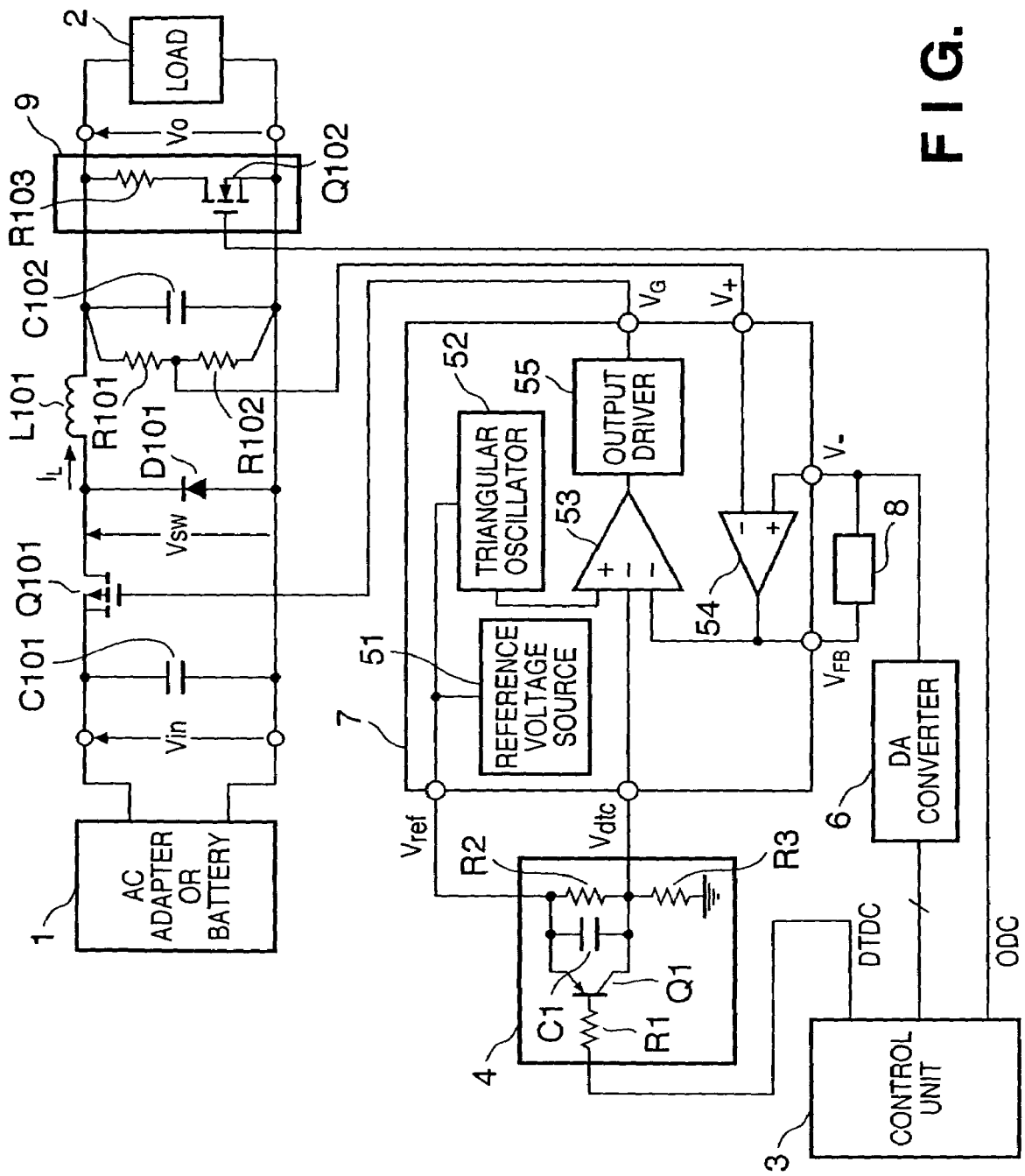
FIG. 12 is a circuit diagram showing the arrangement of the modification of the DC/DC converter.

FIG. 12 is a circuit diagram showing the modification of the DC/DC converter which includes the error amplifier and PWM comparator whose input polarities are inverted. When the output VFB from the error amplifier is high, the circuit shown in FIG. 12 operates such that the ON duty of PWM control increases. Also, the maximum ON duty increases when the output voltage Vdtc of the dead-time control circuit is high. Therefore, in the arrangement and operation of the dead-time control circuit, the magnitude of a voltage value is opposite to that of the above circuit. However, the method of the operation and the means for achieving the object are the same as those of the above circuit, and a detail description thereof will be omitted.

Fourth Embodiment

In the above-described first to third embodiments, each DC/DC converter is used alone. In the fourth embodiment, a DC/DC converter of the present invention serves as a power supply for driving a printhead of an inkjet printer.

Figure 9:
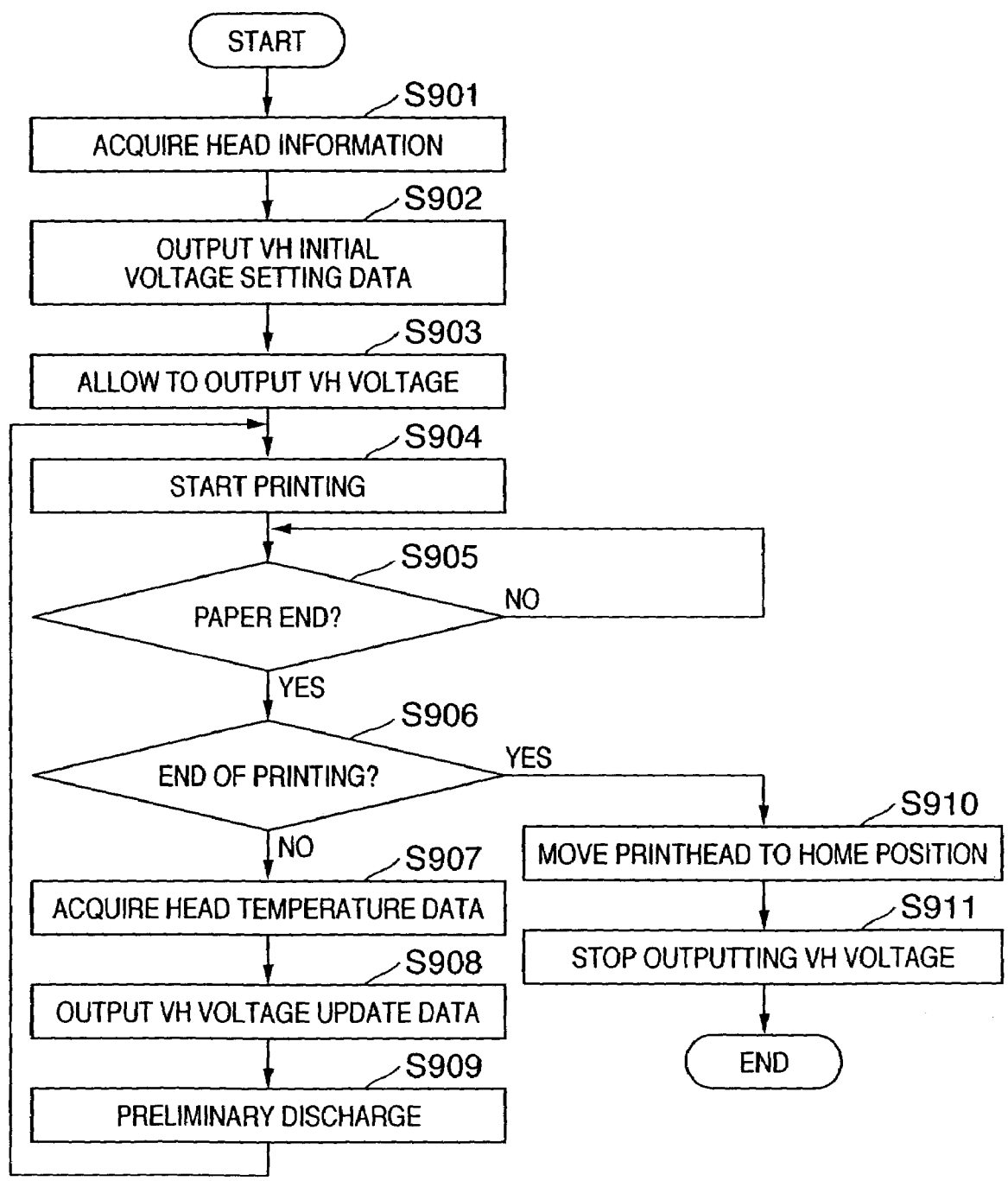
FIG. 9 is a flowchart showing an operation according to the fourth embodiment.
Figure 10:
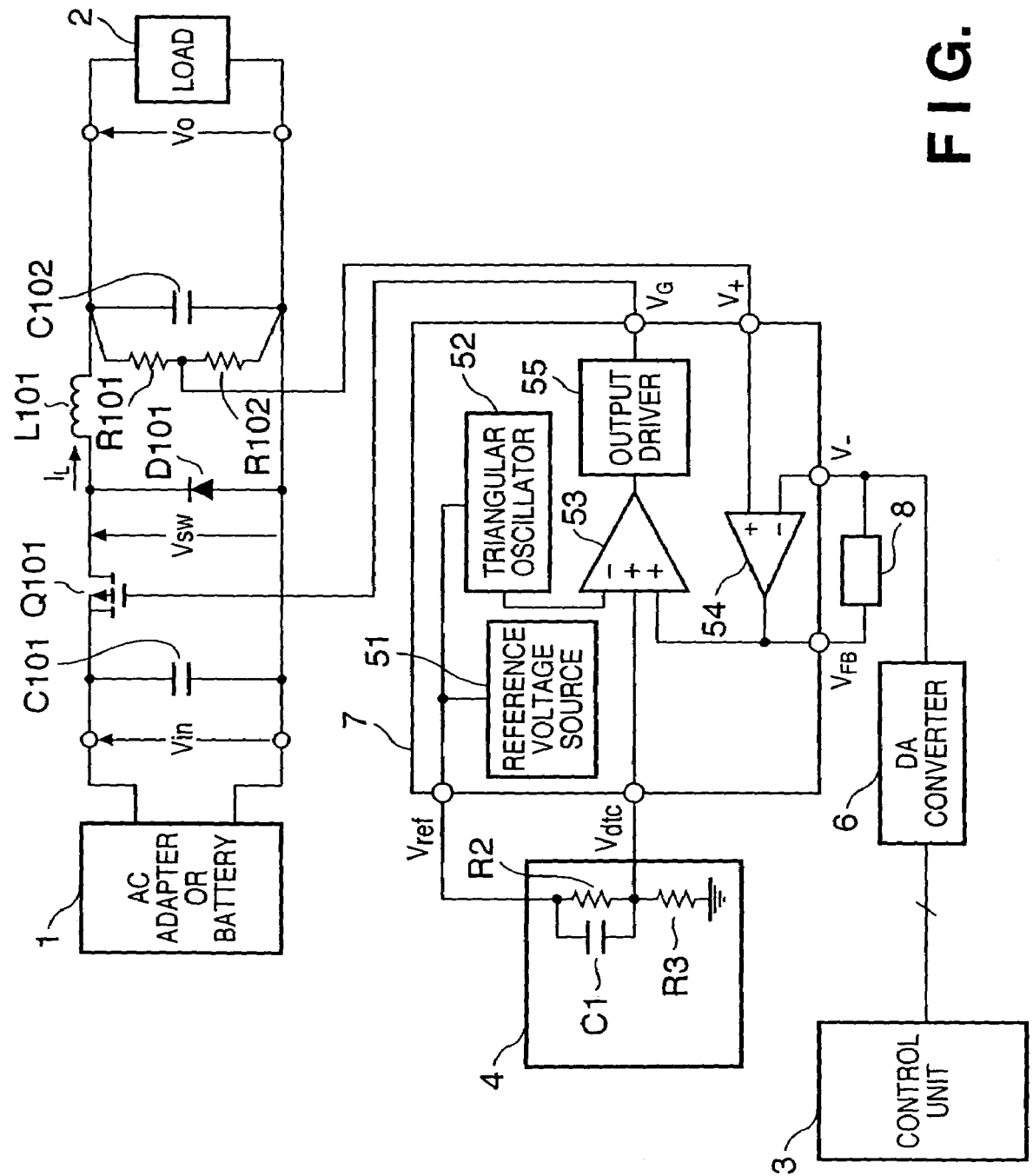
FIG. 10 is a circuit diagram showing the arrangement of a conventional DC/DC converter.
Figure 11:
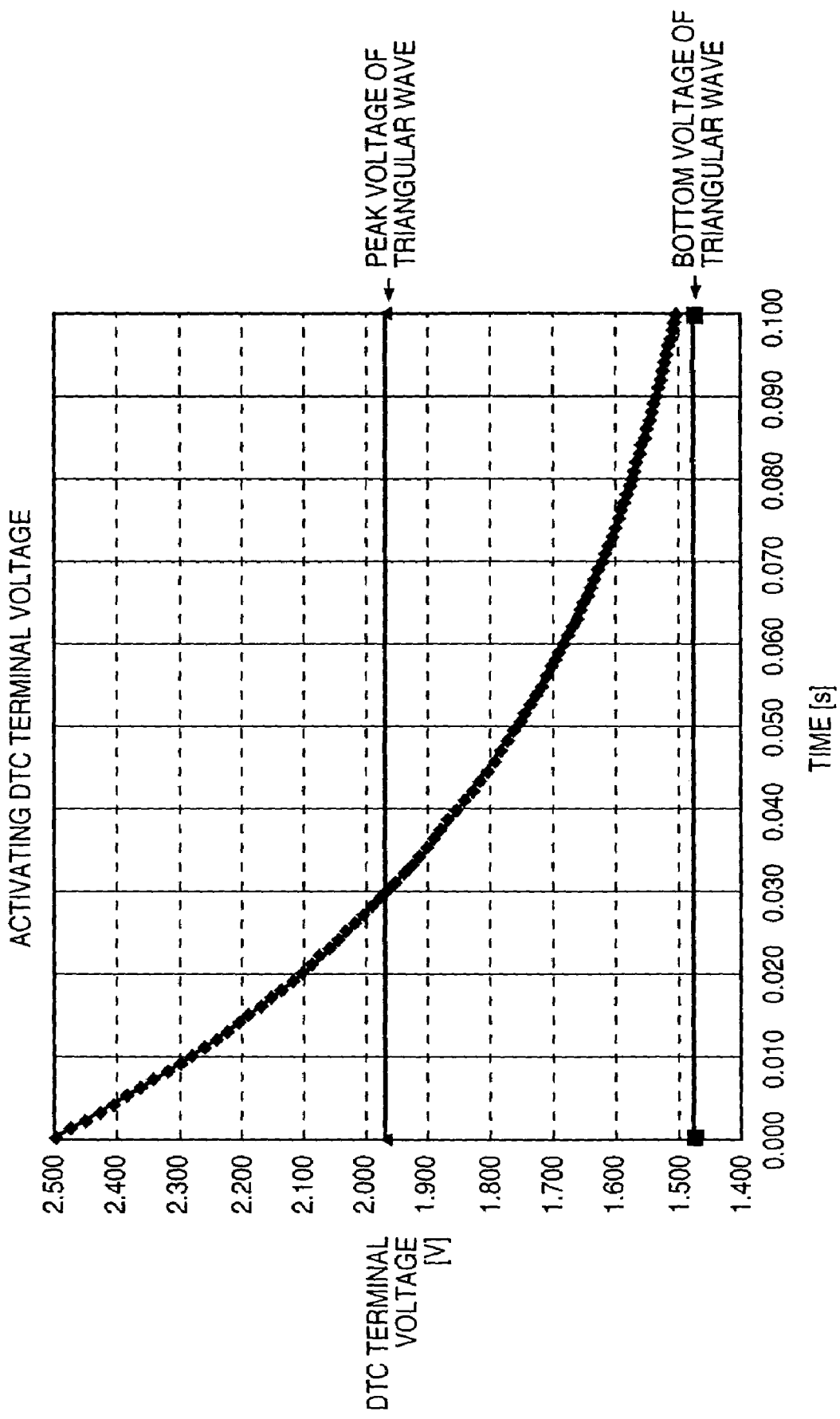
FIG. 11 is a graph showing the change in output from a dead-time control circuit upon power-on as described in the prior art.

FIG. 9 is a flowchart showing a control sequence in changing a power supply voltage to be supplied to the printhead in accordance with a change in temperature of the printhead.

When activating the printer, a control unit in a printer main body first detects a head information signal such as data representing variations in ink discharge characteristics of the mounted printhead (step S901). The DC/DC converter then receives voltage data for setting the power supply voltage in accordance with the ink discharge characteristics (step S902).

When the printing operation is ready to start, a VH output allowance signal for activating the power supply voltage of the printhead is output to the DC/DC converter, and the output voltage based on the voltage setting data is supplied to the printhead (step S903). The printing operation then starts (step S904).

The driving load of the printhead occasionally changes in accordance with the print image. When the image is to be printed by discharging a large amount of ink, the temperature of the printhead can automatically increase by the printing operation executed by one or a plurality of times of scanning, and the ink discharge characteristics undesirably change. In this case, the temperature change of the printhead results in color shading and density change. In order to prevent the degradation of the image quality caused by increasing the temperature of the printhead, in this embodiment, the temperature of the printhead is measured for each scanning, and the power supply voltage of the printhead changes as needed.

More specifically, the printing apparatus determines whether the printhead is arranged at the end of the printing medium (step S905), determines whether the printing operation is complete if YES in step S905 (step S906), measures the temperature of the printhead if NO in the step S906 (step S907), and outputs the setting signal for changing the output voltage setting value of the DC/DC converter from the control unit to the DC/DC converter so as to implement an optimal power supply voltage according to the temperature change (step S908).

In this case, the power supply voltage of the printhead must reach the voltage value which is set until a pre-discharge process executed before the next scanning. The voltage of the DC/DC converter is changed within a predetermined time between the output of the voltage setting signal from the control unit according to the printhead temperature change, and the start of the preliminary discharge process.

The preliminary discharge process is then executed (step S909). After that, the flow returns to the step S904, and executes the next printing operation (scanning).

Alternatively, when determining the printing operation ends in step S906, the printhead is moved to a home position (step S910), the VH output stops (step S911), and a series of operations end.

Note that the power supply voltage is changed not only by the change in temperature of the printhead, but also mode selection so as to change the size of an ink droplet to be discharged.

For example, when the printing mode switches such that the ink amount to be discharged from one nozzle changes from 5 pl (mode 1) to 2 pl (mode 2), the setting signal for changing the output voltage setting value of the DC/DC converter may be output from the control unit to the DC/DC converter so as to obtain the optimal power supply voltage in each of the modes. This mode may be selected for each page. Also, the mode may be selected for each scanning process by multipath printing.

In accordance with switching of the driving frequency of the printhead, the setting signal which changes the output voltage setting value of the DC/DC converter may output from the control unit to the DC/DC converter such that the power supply voltage suitable for the driving frequency can be obtained.

Other Embodiment

In the fourth embodiment, the DC/DC converter of the present invention serves as the power supply for driving the printhead of the inkjet printer. However, the present invention can be applied to a general printing apparatus which prints using thermal energy, other than the serial-type inkjet printer described above (e.g., a printer which uses a full line type printhead having a length corresponding to the width of the largest printing medium printable by a printing apparatus). Also, the present invention can be applied to a general electronic device which must change the power supply voltage within a short period of time during operation.

Note that the present invention can also be applied to a system including a plurality of devices (e.g., host computer, interface device, reader, and printer), or an apparatus including one device (e.g., copying machine, and facsimile device).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-406142 filed on Dec. 4, 2003, which is hereby incorporated by reference herein.

What is claimed is:

1. A power supply device comprising:
    a PWM-controlled DC/DC converter capable of changing an output voltage on the basis of a setting signal, the DC/DC converter including a voltage change circuit configured to change a dead-time control voltage in accordance with a control signal and a dead-time control circuit which sets an upper limit value of an ON duty of a PWM main switching element at a predetermined time constant in accordance with the dead-time control voltage; and
    a control unit configured to output the setting signal instructing a change from a first voltage, which is presently being output, to a second voltage, and the control signal of a pulse width according to the first or second voltage;
    wherein said control unit outputs the control signal so as to set the upper limit value of the ON duty to a given value larger than a mean value of an ON duty corresponding to the first voltage and an ON duty corresponding to the second voltage.

2. The device according to claim 1, wherein said dead-time control circuit includes a capacitor which determines the time constant, and said voltage change unit includes a discharge switching element connected parallel to said capacitor to discharge said capacitor in accordance with the control signal.

3. The device according to claim 2, wherein said voltage change unit controls an ON time of said discharge switching element in accordance with the control signal, thereby changing the dead-time control voltage.

4. The device according to claim 1, further comprising an output capacitance discharge circuit formed from a resistor and switching element arranged between output terminals of said DC/DC converter, wherein said control unit outputs a discharge control signal which operates said output capacitance discharge circuit for a predetermined period of time in synchronism with the setting signal which changes the output voltage.

5. The device according to claim 4, wherein said control unit outputs the discharge control signal only when the output voltage is set lower than the present value.

* * * * *